(12) United States Patent
Park (10) Patent No.: US 8,782,048 B2
(45) Date of Patent: Jul. 15, 2014

(54) METHOD OF DISPLAYING ADAPTIVE ALBUM ART FOR PORTABLE TERMINAL AND APPARATUS FOR PROVIDING THE SAME

(75) Inventor: Young-Sik Park, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 402 days.

(21) Appl. No.: 12/804,036

(22) Filed: Jul. 13, 2010

(65) Prior Publication Data

US 2011/0016126 A1    Jan. 20, 2011

(30) Foreign Application Priority Data

Jul. 14, 2009   (KR) .................. 10-2009-0064214

(51) Int. Cl.
*G06F 17/30* (2006.01)

(52) U.S. Cl.
USPC .......................................................... 707/737

(58) Field of Classification Search
USPC ........................................ 707/737, 999.005
See application file for complete search history.

(56) References Cited

U.S. PATENT DOCUMENTS

| | | | | |
|---|---|---|---|---|
| 2007/0038671 | A1* | 2/2007 | Holm et al. ................ | 707/104.1 |
| 2009/0063971 | A1* | 3/2009 | White et al. .................. | 715/716 |
| 2009/0076881 | A1* | 3/2009 | Svendsen ...................... | 705/10 |

OTHER PUBLICATIONS

Samsung; "MP3 Player: YP-P3 User Manual (Extracts);" Jun. 24, 2009; Retrieved from internet : < http://downloadcenter.samsung.com/content/UM/200906/20090624094737796/YPP3-COMMON-ENGLISH3.0.pdf > (retrieved on Sep. 16, 2010); XP002601417.

Samsung; "YP-P3 User Manual;" Sep. 24, 2009; Retrieved from internet: < http://hk.samsungmobile.com/ENG/mp3-players/samsung-yp-p3-support?mp3Model=YP-P3CB> (retrieved on Sep. 20, 2010); XP002606892.

Lee, K J; "Review: Samsung P3 (YP-P3);" Mar. 12, 2009; Retrieved from internet: < http://www.pocketables.net/2009/03/review-samsung-p3-ypp3.html > (retrieved on Sep. 16, 2010); XP002601416.

Samsung; "Samsung M7600 User Manual (Extracts);" Apr. 2009; Retrieved from internet: <http://downloadcenter.samsung.com/content/UM/200904/20090404084307125/Samsung_M7600_UM_Open_Eng_Rev.1.0_090403.pdf > (retrieved on Sep. 20, 2010); XP002601420.

Samsung; "Samsung M7600 Beat DJ Preview: First Look;" Feb. 16, 2009; Retrieved from internet: < http://www.gsmarena.com/samsung_m7600_beat_dj-review-316p4.php > (retrieved on Sep. 20, 2010); XP002601419.

Healy, Greg; "djay: Music Mixing, Mac Style;" Apr. 28, 2007; Retrieved from internet: < http://macapper.com/2007/04/28/rdydjay-music-mixing-mac-style/ > (retrieved on Sep. 16, 2010); XP002601418.

Choi, Hyong-uk; Patent application Publication No. US 2008/0114764 A1; Publication Date: May 15, 2008; "Content Classification Method and Content Reproduction Apparatus . . . ;".

Chaudhri, Imran A.; Patent Application Publication No. US 2009/0177966 A1; Publication Date: Jul. 9, 2009; "Content Sheet for Media Player;".

* cited by examiner

*Primary Examiner* — Yuk Ting Choi
(74) *Attorney, Agent, or Firm* — Cha & Reiter, LLC (57) ABSTRACT

A method of displaying an adaptive album art for a portable terminal is provided, which includes confirming whether the album art exists by reading meta data frame that corresponds to at least one sound source data, classifying and storing the sound data by meta data items commonly included in the corresponding meta data information if the album art exists, extracting an image file from the album art of the sound source data classified by meta data items, and matching the extracted image file to a changeable disc album art preset by meta data items to display the matched image.

11 Claims, 6 Drawing Sheets
(4 of 6 Drawing Sheet(s) Filed in Color)

METHOD OF DISPLAYING ADAPTIVE ALBUM ART FOR PORTABLE TERMINAL AND APPARATUS FOR PROVIDING THE SAME

CLAIM OF PRIORITY

This application claims the priority under 35 U.S.C. §119(a) of an application entitled "Method Of Displaying Adaptive Album Art For Portable Terminal And Apparatus For Providing The Same" filed in the Korean Intellectual Property Office on Jul. 14, 2009 and assigned Serial No. 10-2009-0064214, the contents of which are hereby incorporated by reference.

BACKGROUND OF THE INVENTION

1. Field of the Invention

The present invention relates to a portable digital playback apparatus, and more particularly to a method of displaying an adaptive album for a portable terminal and an apparatus for providing the same.

2. Description of the Related Art

Recently, functions of MP3 file playback apparatuses have been diversified and include playing audio, outputting caption, displaying album art, and the like. In general, a portable digital playback apparatus plays data of diverse digital types. Representative examples are an MP3 player and an MP3 phone to which the MP3 player has been applied.

Although the source of data may have various formats, MP3 type source data (hereinafter referred to as "MP3 data") encoded in an MP3 encoding method is explained briefly to give a background.

MP3 encoding is one of high-quality audio compression techniques prescribed in MPEG1, and one of audio encoding techniques which can compress audio 50 times more than a general CD technique while maintaining the CD sound quality. In the encoded MP3 data, a special frame called ID3 tag information is added to the front or rear end of a data file. For example, ID3 tag information may include text and other data related to sound source files, that is, ID3 tag items.

A user can easily search for or classify specified MP3 data among a plurality of MP3 data stored in a digital playback apparatus during operation. The data field of such ID3 tag items includes Version 1.1 and Version 2.0.

First, Version 1.1 of the ID3 tag is composed of a data field of information, such as title, player or singer, album name, year of issue, genre, information such as additional explanation, and the like.

Next, Version 2.0 or higher of the ID3 tag has added data fields of information, such as the words of a song/text, attached photo, event timing code, and the like.

In general, the digital playback apparatus has functions of generating and editing a playback list that includes only sound data which a user searches for or classifies using the ID3 tag items, or which the user has directly selected or classified using such ID3 tag items. This playback list may be used so that a user can easily replay the sound data that is searched, classified, or selected by the user later. Generally, a playback list generation method that is called M3U is used to play back MP3 data.

However, such an M3U playback list is generated only as a text file that includes a numbered list according to the file path or position order of the audio data included in the list. That is, the M3U file format only includes file position or path information, a file name, and a comment field, but does not include other information included in the ID3 tag of the MP3 data.

Moreover, information on the sound data among MP3 data stored in the digital playback apparatus may not be accurately recorded on the ID3 tag items. That is, for example, if an artist name, issue year, and the like, are not accurately recorded, such information is not included in the ID3 items of the corresponding MP3 data. In this case, the digital playback apparatus indicates this as "Unknown" since no information is included when reading the ID3 tag information of the MP3 data. Accordingly, the MP3 data can be classified only as the "Unknown" item in the corresponding ID3 tag item.

Accordingly, there is no way for the user to differently classify the MP3 data that is "Unknown" item. That is, if a genre among the ID3 tag items of the MP3 data is "Unknown", the user cannot classify or search for the corresponding MP3 data in other genres except for the "Unknown" item.

Figure 1:
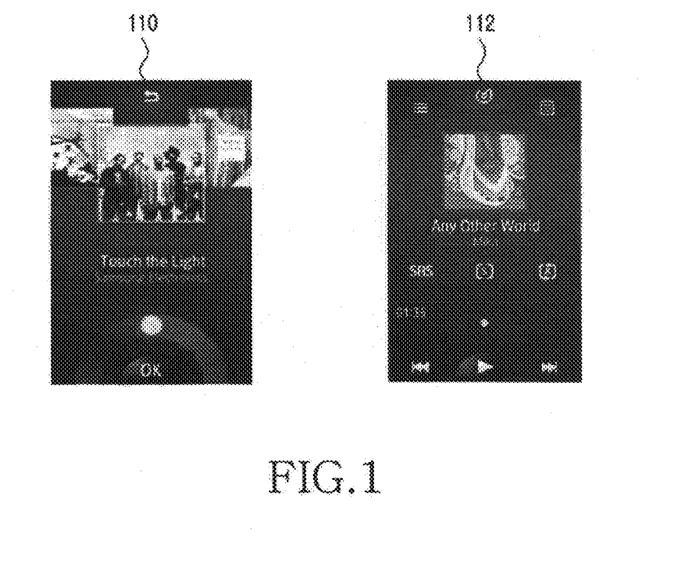
FIG. 1 is a diagram illustrating an MP3 file playback apparatus that displays a general tetragonal album art.

Furthermore, since an album art that indicates a jacket image of the corresponding sound source data is kept in a fixed form of a tetragon in the ID3 tag, as illustrated as "110" in FIG. 1, the audio data including diverse ID3 tag information are collectively provided. That is, "110" of FIG. 1 shows diverse sound source data stored in a portable terminal, and "112" of FIG. 1 shows a next window after a selection of item for replay from a particular album.

As a result, a GUI (Graphic User Interface) user is typically not satisfied with such tetragonal shape of the album art displayed during operation as in FIG. 1. That is, the user many want to see another different shape during display. The album art that is displayed, as shown in "110" of FIG. 1 using the ID3 tag information has a limited data display mode that can be expressed. This problem also occurs in the same manner while the corresponding sound data is played as shown in "112" of FIG. 1.

If the tetragonal album art is modified into another shape in order to solve the above-mentioned problem, there is a possibility of generating IPR (Intellectual Property Right) issue from the author of the corresponding audio data.

SUMMARY OF THE INVENTION

Accordingly, the present invention has been made to solve the above-mentioned problems occurring in the prior art, and the present invention provides a method of displaying an adaptive album art for a portable terminal and an apparatus for providing the same which enables a user to easily change an album art that maintains a fixed tetragonal shape using ID3 tag information in a portable digital playback apparatus, and displays sound data having diverse types of images to satisfy GUI user.

In accordance with an aspect of the present invention, a method of displaying an adaptive album art for a portable terminal includes confirming whether the album art exists by reading meta data frame that corresponding to at least one sound source data; classifying and storing the sound data by meta data items commonly included in the corresponding meta data information if the album art exists; extracting an image file from the album art of the sound source data classified by meta data items; and superimposing the extracted image file to a preset changeable disc album art to display the superimposed image.

In accordance with another aspect of the present invention, an apparatus for displaying an adaptive album art for a portable terminal includes a storage unit storing at least one sound source data and a plurality of image files; a control unit classifying and storing the corresponding sound source data by meta data items in accordance with meta data information read from the meta data reading unit, extracting and storing an image file from the sound source data in which the album art exists, and overlaying the extracted image file to a preset changeable disc album art; a display unit displaying the meta data information as various kinds of image information under the control of the control unit; and an interface unit sensing user's selection of various image information corresponding to at least one sound source data that is displayed through the display unit.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

The above and other aspects, features and advantages, of the present invention will be more apparent from the following detailed description taken in conjunction with the accompanying drawings, in which.

DETAILED DESCRIPTION OF THE INVENTION

Hereinafter, exemplary embodiments of the present invention will be described with reference to the accompanying drawings. In the following description, various specific definitions found in the following description are provided only to help general understanding of the present invention, and it is apparent to those skilled in the art that the present invention can be implemented without such definitions.

The basic principle of the present invention will be described briefly. Audio/Sound source data of a portable terminal according to an embodiment of the present invention is supported in diverse forms, such as an MP3 file, an OGG (Ogg Vordia) file, a WMA (Window Media Audio) file, an ASF (Active Streaming Format) file, and the like. Also, a file playback apparatus may be combined with a portable phone, a digital camera, navigation device, PMP (Portable Multimedia Player), and the like. Accordingly, a portable terminal is used hereinafter as a multi-function portable device.

In explaining the present invention, the wording "meta data" means, but is not limited to, ID3 tag information that is added to a sound source data file such as MP3 data typically used in the field of the present invention.

The sound source data is supported in diverse forms, such as an MP3 file, an OGG file, a WMA file, an ASF file, and the like, and it is assumed that the sound source data is divided into an audio region for playing music and a meta data region.

Also, data fields of the meta data include Version 1.1 and Version 2.0.

Meta data of Version 1.1 is composed of a three-bit header, a 30-byte title, an artist and album name, a four-bit issue year, a 28-byte comment, a 2-byte track, and one-byte genre.

The meta data of Version 2.0 or more additionally includes an image frame in addition to the construction of the meta data filed of Version 1.1. In this case, the image frame includes an image such as an album jacket and so on in the form of binary data.

Figure 2:
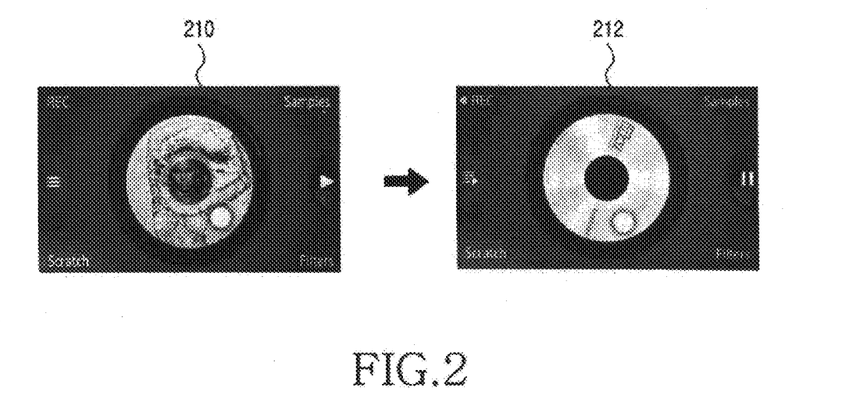
FIG. 2 is an exemplary view of a display screen to which technology of displaying an adaptive album art for a portable terminal is applied according to an embodiment of the present invention.

FIG. 2 is an exemplary view of a display screen to which technology of displaying an adaptive album art for a portable terminal is applied according to different embodiments of the present invention. Briefly, FIG. 2 illustrates two modes of display outcome according to the teachings of the present invention. However, a detailed explanation of the process will be discussed in detail later with reference to FIGS. 5-7.

Referring to FIG. 2, it is exemplified that a music playback display screen 210 of the portable terminal according to a first embodiment of the present invention is applied to a changeable disc album art that fills about 80% of the screen while a meta data frame of the sound source data is read. The changeable disc album art represents the disk shaping including the album jacket and comprises graphics of diverse shape other than a round CD shape shown in FIG. 2. According to the first embodiment, a jacket image, that is, an image of the sound source data in which an album art exists, is extracted from the meta data information, superimposed on the selected changeable disc art shape and displayed as shown in "210" of FIG. 1.

Also, it is exemplified that a music playback display screen 212 of the portable terminal according to a second embodiment of the present invention is applied to a beat DJ changeable disc album art of a turntable image on which a user can directly scratch or superimpose a particular image on the changeable disc album art using a touch screen method. Here, the term "beat DJ" means that a user directly controls the changeable disc album art using a touch screen by displaying a desired turn table image on the screen so that the DJ function can be previewed during the playback of music. That is, as a user scratch the changeable disc album back and forth, the sound data will be played according to such action.

Hereinafter, an apparatus for displaying an adaptive album for a portable terminal according to a preferred embodiment of the present invention will be described with reference to a display screen to which the technology for the adaptive album art display of the portable terminal.

Figure 3:
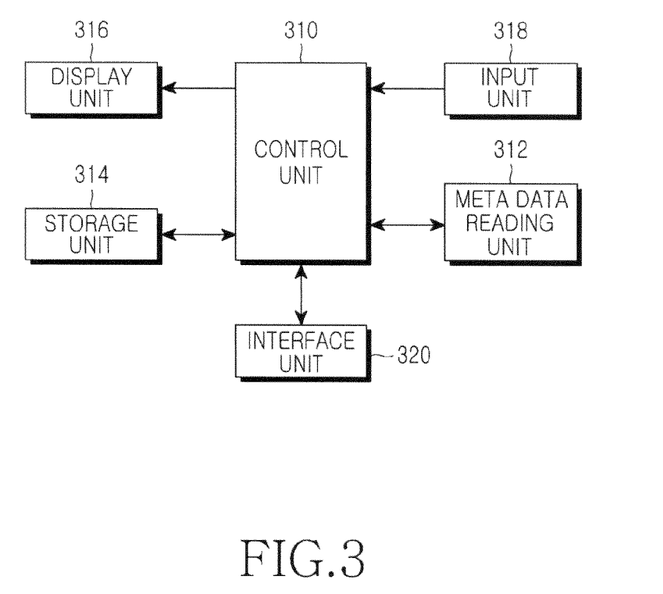
FIG. 3 is a block diagram illustrating the configuration of an apparatus for displaying an adaptive album art for a portable terminal according to an embodiment of the present invention.

FIG. 3 is a block diagram illustrating the configuration of an apparatus for displaying an adaptive album art for a portable terminal according to an embodiment of the present invention.

Referring to FIG. 3, the apparatus for displaying an adaptive album art for a portable terminal to which the present invention is applied includes a control unit 310, a meta data reading unit 312, a storage unit 314, a display unit 316, an input unit 318, and an interface unit 320.

The storage unit 314 stores at least one sound source data and a plurality of image files. The plurality of image files is files in which images, which can be displayed and output by the apparatus for displaying an adaptive album art for a portable terminal, are recorded.

The image file is a file in which image information for display through the display unit 316 while the audio data is played by the apparatus for displaying the adaptive album art for a portable terminal, is recorded. In operation, a user can selectively select the image of the image file displayed through the apparatus for displaying the adaptive album art for a portable terminal in the form of an album art and a changeable disc album art using the image file.

The display unit 316 displays meta data information that corresponds to at least one sound source data as image information by items under the control of the control unit 310.

The meta data items mean a title, musician, album year, comment, album art, genre, and the like.

The meta data reading unit 312 confirms whether the album art exists by reading meta data information from the corresponding sound source data. More specifically, it determines whether the album art that indicates a jacket photo or image of the corresponding sound source data, which is input from an external device through the input unit 318 according to an interface protocol with the external device such as a PC or which is included in the meta data information of the pre-stored sound source data, is included in the meta data information of the corresponding sound source data, and if so, the read information is output to the control unit 310.

The control unit 310 classifies the corresponding sound source data by meta data items according to the meta data information read from the meta data reading unit 312 to store the classified sound source data in the storage unit 314, and extracts the image file from the sound source data in which the album art exists to store the extracted image file in the storage unit 314. Then, the control unit 310 superimposes/overlays the extracted image file to the changeable disc album art preset by meta data items. As an illustrative example, the following table illustrates type of different preset image to which a desired image can be superimposed.

| Meta data items | Title | Artist | Album year | Comment | Genre |
| --- | --- | --- | --- | --- | --- |
| shape of the changeable disc album art corresponding to the extracted image | Ex) triangle | Ex) lozenge | Ex) pentagon | Ex) hexagon | Ex) star |

Here, the changeable disc album art represents different shapes of a disc in the form of a circle or other form, such as a polygon. In the embodiment of the present invention, the disc shape is defined as a changeable disk album for illustrative purposes. Although the changeable disc album art is illustrated in the form of a circular disc throughout the drawings for illustrative purposes, the form of the changeable disc album art is not limited thereto. Thus, disc image having different forms can be applied to the changeable disc album art using other forms (for example, triangle, lozenge, tetragon, and the like) based on meta data items (such as the title, musician, album year, comment, and genre, which are related to the specified sound source data). The user may selectively preset the desired shape or form of the changeable disc album art.

On the other hand, if the album art does not exist, the control unit 310 receives a user input for selecting a specified image through the interface unit 320 among the plurality of image files that are pre-stored in the storage unit 314, and adds the image file that corresponds to the user input to the meta data frame for display.

In succession, the control unit 310 reads the corresponding sound source data input through the input unit 318. If it is assumed that the sound source data corresponds to "classic" in "genre" item among the meta data items, corresponds to "A" in the "title" item in alphabetical order, and corresponds to "ga" in "artist" item in Korean alphabet order. Note that "ga" has the same meaning as above in Korean alphabet order. In this case, the sound source data is classified by items, priorities are given to the title, artist, album name, or genre information included in the meta data frame, the classified sound source data is aligned according to the priority, and the aligned sound source data is displayed through the display unit 316 according to a user's request. The priorities are preset by the user or are determined by a protocol set by manufacturer of the portable terminal.

Also, the control unit 310, if a user selection through the interface unit 320 occurs in a specified album art among the displayed album arts, as illustrated in FIGS. 5 and 6, the control unit 310 controls a part of the corresponding changeable disc album art corresponding the specified album art to be displayed via user's manipulation from the selected specified album art.

FIGS. 5A to 5C and 6A to 6C are exemplary views illustrating a display screen which shows the schematic operation of the control unit 310.

Figure 5A:
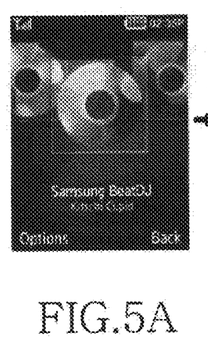
FIGS. 5 and 6 are exemplary views of a display screen illustrating a schematic operation of a control unit in an apparatus for controlling an adaptive album art for a portable terminal according to an embodiment of the present invention.
Figure 5B:
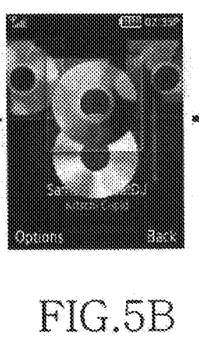
Figure 5C:
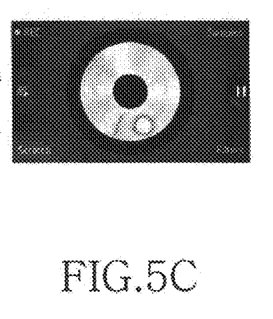

First, FIG. 5A is an exemplary view illustrating an album art corresponding to at least one sound source data, which is displayed on the screen, FIG. 5B is an exemplary view illustrating a part of the corresponding changeable disc album art matching the specified album art, which is displayed to be slidably drawn out from the selected specified album art as a user selects a desired art, and FIG. 5C is an exemplary view illustrating the corresponding sound source date being played. That is, Each (a), (b), (c) of FIGS. 5 and 6 shows operations to be sequentially performed. Specifically, FIG. 5A illustrates how a user selects a sound source data among diverse source data, FIG. 5B illustrates how the disc (the changeable disc album art) of the sound source data is selected by a user via sliding manipulation to overly the selected sound source data onto the changeable disc album art, and FIG. 5c shows how the sound source data slidably selected from (b) is displayed. In particular, FIG. 5c shows an operation for playing the sound data before applying the extracted image to the changeable disc album art. Thus. FIG. 5 shows the sound data in which the meta data (e.g. ID3 tag information) exists, and FIG. 6 shows the sound data for allowing the DJ function.

Figure 6A:
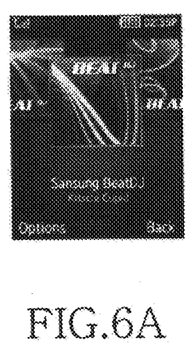
Figure 6B:
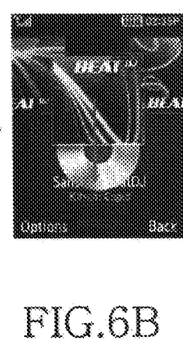
Figure 6C:
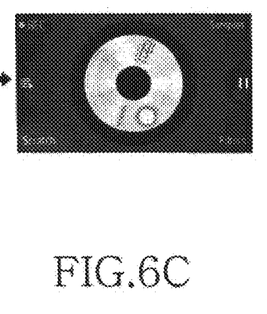

In particular, FIGS. 6A to 6C shows the sequential change, except that a desired rectangular image is selected and displayed by superimposing the selected image onto a disc shape surface.

As described above, the control unit 310 exchanges the sound source data including the MP3 data with the external device according to the interface protocol with the external device such as the PC, and plays the sound source data according to the user's selection through the playback protocol of the pre-stored sound source data by loading the specified sound source data stored in the storage unit 314, and provides a management function such as search, classification, and the like, of the sound source data.

The interface unit 320 senses the user's selection of the various kinds of image information corresponding to at least one sound source data being displayed through the display unit 316, and outputs the sensed information to the control unit 310.

Hereinafter, a method of displaying an adaptive album art for a portable terminal according to a preferred embodiment of the present invention using the inventive apparatus will be described in detail with reference to FIG. 4.

Figure 4:
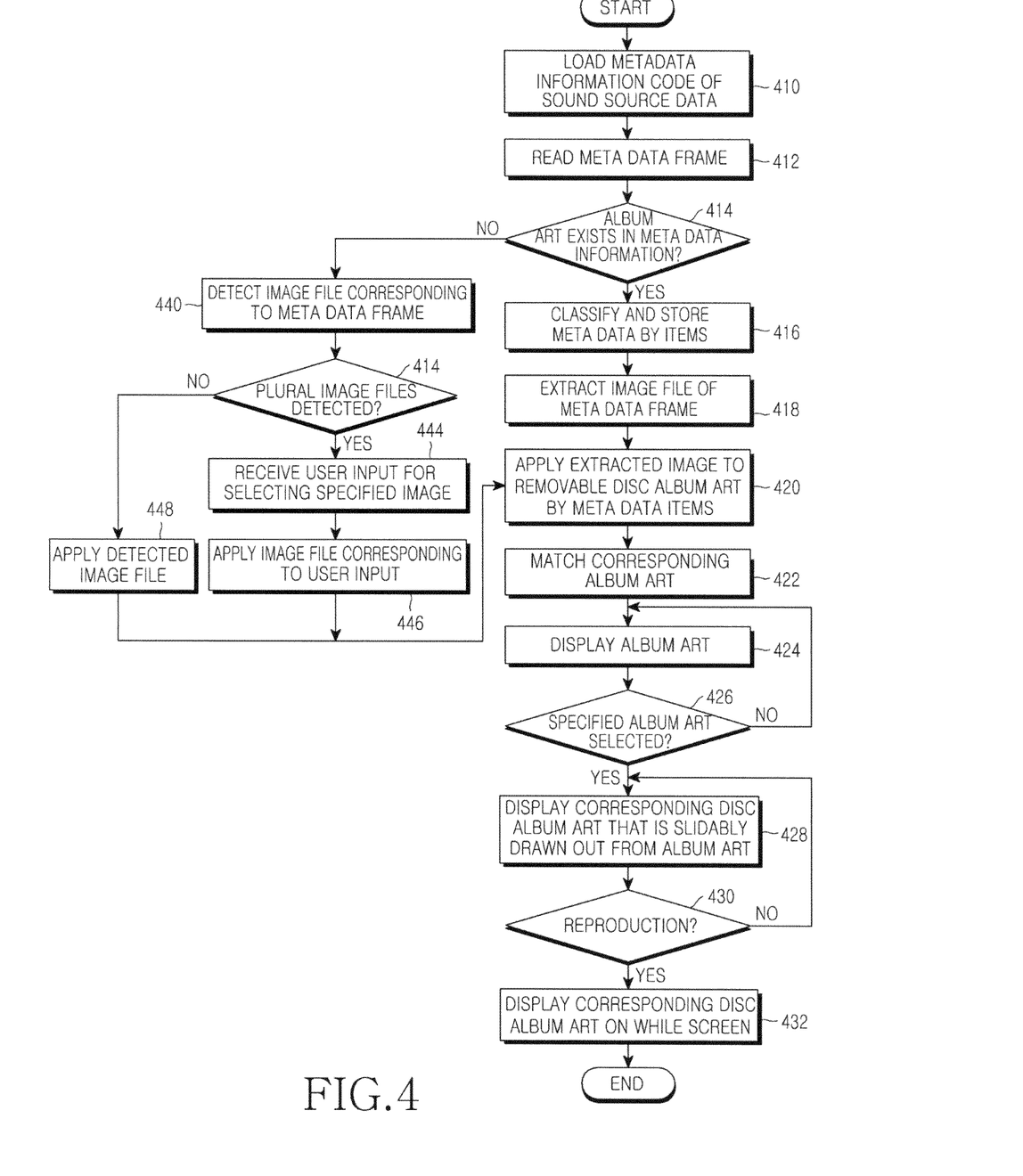
FIG. 4 is a whole flowchart illustrating a method of displaying an adaptive album art for a portable terminal according to an embodiment of the present invention.

FIG. 4 is a flowchart illustrating a method of displaying an adaptive album art for a portable terminal according to an embodiment of the present invention.

Referring to FIG. 4, in step 410, meta data information of sound source data, which is input from an external device according to an interface protocol with the external device such as a PC or which is pre-stored, is loaded, and in step 412, respective meta data frames included in the respective meta data information of the sound source data are read out.

Here, the meta data frame represents information included in the meta data information, that is, information on a title, a musician, an album year, a comment, an album art, a genre, and the like. Accordingly, if the step 412 is completed, it is judged whether an album art that is related to the corresponding sound source data exists in the meta data frame in step 414.

If the album art exists, the corresponding sound source data is classified and stored by meta data items (step 416). For example, if the sound source data corresponds to "classic" in "genre" item among the meta data items, corresponds to "A" in the "title" item in alphabetical order, and corresponds to "ga" in "artist" item in "Hangul" alphabet order as a result of reading the sound source data, the sound source data is classified by items, priorities are given to the title, artist, album name, or genre information included in the meta data frame, the classified sound source data is aligned according to the priorities, and the aligned sound source data is displayed according to a user's request. In this case, the priorities are preset by the user or are determined by a classification protocol of the sound source data.

Then, in step 418, the image file is extracted from the album art, and in step 420, the extracted image file is superimposed onto the preset changeable disc album art by meta data items. Here, the changeable disc album art means the preset changeable disc album art by items, such as meta data "genre", "title", "artist", and "album year", and is generated in different forms of a circle or a polygon by items.

Further, the changeable disc album art preset by items may be subdivided from the representative item, for example, "genre" item, into sub-items of "classic", "popular song", "ballad", "hip-hop", and the like.

Also, if a display request for at least one sound source data is made based on the specified item of the specified meta data information, the corresponding sound source data are displayed in accordance with the priorities given the genre item.

If a user's selection occurs in a specified album art among the displayed album arts (step 426), a part of the corresponding changeable disc album art matching the specified album art in step 420 is displayed so as to be slidably drawn out via user's manipulation from the selected specified album art. In this case, the display of the changeable disc album art which is slidably drawn out, is performed by a user's finger using a touch screen, tapping using a device, or key input using a drag and a keypad.

Also, if a playback of the corresponding album art, which is displayed so as to be slidably drawn out, is desired (step 430), the sound source data is played according to the playback protocol of the pre-stored sound source data, and the changeable disc album art is displayed on the whole screen (step 432) as illustrated in FIG. 5C and FIG. 6C.

On the other hand, if the album art that is related to the corresponding sound source data does not exist in the meta data frame (for example, unknown sound source data) as a result of judgment in step 414, the processing proceeds to step 440, and the image file that corresponds to the meta data frame is detected. In this case, the image file represents a file in which an image that can be displayed by the inventive apparatus is recorded, and can be generated, set, and stored by a user.

The image file detected in step 440 is added to the meta data frame in which no album art exists (step 448).

If a plurality of images is detected in step 440 (step 414), a user's input for selecting a specified image is received (step 444), and an image file that corresponds to the user's input is added.

Figure 7A:
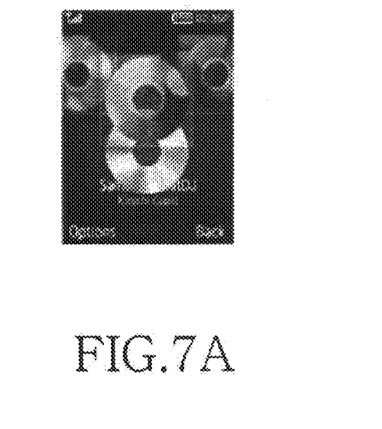
FIGS. 7A to 7D are exemplary views illustrating a display screen to which an image is applied to the album art in an apparatus for displaying an adaptive album art for a portable terminal according to an embodiment of the present invention.
Figure 7B:
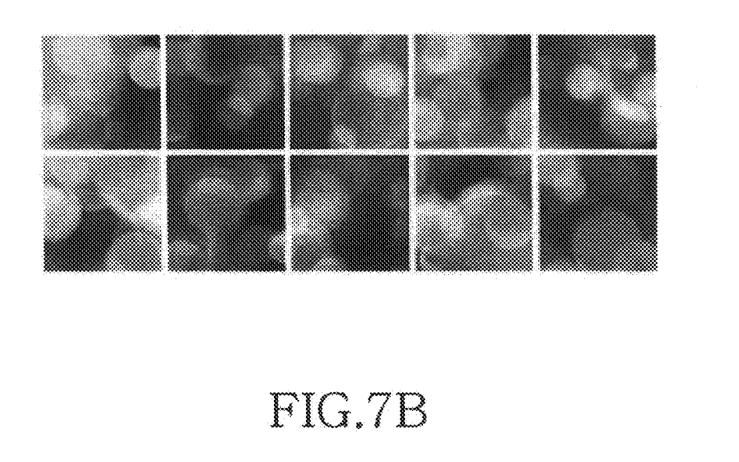
Figure 7C:
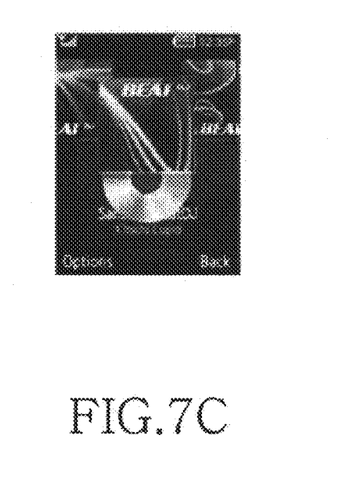
Figure 7D:
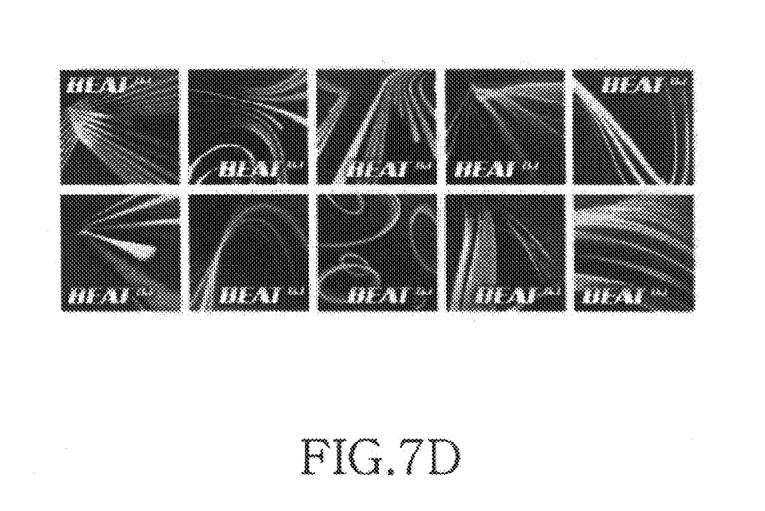

FIGS. 7A to 7D are exemplary views illustrating a display screen to which processing of steps 440 to 448 is applied. FIGS. 7A and 7B are exemplary views illustrating a display screen in which one of images where a plurality of unknown sound source data having no album art exists is selected and applied to the album art, and FIGS. 7C and 7D are exemplary views illustrating a display screen in which one of images where a plurality of beat DJ sound source data, whereby the user can directly scratch or superimpose the disc image using a touch screen method, exists is selected and applied to the album art.

As described above, the meta data frame of the corresponding sound source data to which the image file is added returns to step 420 and performs the following operation.

As described above, according to the present invention, the user can easily display an album art in a desired disc form on the portable digital sound source playback apparatus with respect to the corresponding sound source data using an album art image of the meta data information of the sound source data.

Also, in the case of an "Unknown" sound source data in which the album art is not provided in the meta data information of the corresponding sound source data, the user can apply a desired image of a photo file, and thus can manage the sound source data more easily.

Note that the above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain exemplary embodiments thereof, it will be, understood by those skilled in the art that various changes in form and details may be made therein without departing from the spirit and scope of the invention as defined by the appended claims.

What is claimed is:

1. A method of displaying an adaptive album art for a portable terminal, comprising the steps of:
   determining whether the album art corresponding to at least one sound data exists based on reading of a meta data frame received therein;
   classifying and storing the sound data by meta data items included in the meta data frame if the album art exists;
   extracting an image file from a plurality of image files of the album art of the sound data classified by the meta data items;

superimposing the extracted image file onto a preset changeable disc album art having a predetermined shape for display;

wherein when the album art corresponding to the least one sound data does not exist or the meta data frame is erroneous or cannot be read, receiving a user-input image or retrieving a plurality of image files from storage for a subsequent user selection; and transferring a user-selected image file to the meta data frame in which the album art does not exist, wherein the meta data frame includes ID3 tag information added to the at least one sound data and wherein a shape of the changeable disc album art comprises a plurality of shapes corresponding to an extracted image.

2. The method as claimed in claim 1, further comprising: displaying a specified album art corresponding to the at least one sound source data for a subsequent selection.

3. The method as claimed in claim 2, further comprising playing the corresponding sound data and displaying the changeable disc album art on a display screen during a playback request for the specified album art.

4. The method as claimed in claim 1, wherein the changeable disc album art is in form of a circle or a polygon.

5. The method as claimed in claim 2, wherein subsequent selection of the specified album art onto the changeable disc album art is achieved via a touch screen or a key input.

6. The method as claimed in claim 3, wherein the playback of the specified album art is performed according to a preset data playback protocol.

7. The method as claimed in claim 1, wherein if a display of the sound data by specified meta data items is requested, priorities are given to a title, an artist, an album name, or genre information included in the meta data frame, and the classified sound data is aligned according to the priority for a display.

8. An apparatus for displaying an adaptive album art for a portable terminal, comprising:

a storage unit storing at least one sound data and a plurality of image files;

a control unit classifying and storing the corresponding sound data by meta data items in accordance with meta data information read from the meta data reading unit, extracting and storing an image file from the sound data in which the album art exists, and transferring the extracted image file to a preset changeable disc album art having a predetermined shape for display;

a display unit displaying the meta data information under the control of the control unit; an interface unit sensing user's selection of various image information corresponding to the at least one sound data that is displayed through the display unit; wherein when the album art corresponding to the least one sound data does not exist or the meta data reading unit determined the meta data information is erroneous or cannot be read, the control unit retrieves a plurality of image files from storage or user input image for a subsequent user selection; and transferring the selected image file to the meta data frame in which the album art does not exist, wherein the meta data frame includes ID3 tag information added to the at least one sound data and wherein a shape of the changeable disc album art comprises a plurality of shapes corresponding to an extracted image.

9. The apparatus as claimed in claim 8, wherein if a user selects a specified album art among the displayed album arts through the interface unit, the control unit displays a part of the corresponding changeable album art matching the specified album art.

10. The method as claimed in claim 1, wherein the control unit classifies and stores the sound data by meta data items comprises a user-selectable priority of particular meta data items, and wherein the sound data is user-classifiable when the meta data frame is erroneous or cannot be read.

11. The apparatus as claimed in claim 8, wherein the classifying and storing of the sound data according to meta data items includes user-selectable priority of particular meta data items, and wherein the sound source data is user-classifiable when the meta data information erroneous or cannot be read.

* * * * *

UNITED STATES PATENT AND TRADEMARK OFFICE
CERTIFICATE OF CORRECTION

PATENT NO.       : 8,782,048 B2
APPLICATION NO.  : 12/804036
DATED            : July 15, 2014
INVENTOR(S)      : Young-Sik Park It is certified that error appears in the above-identified patent and that said Letters Patent is hereby corrected as shown below:

In the Claims:

Column 9, Claim 3, Lines 18-19 should read as follows:
--...further comprising: playing the...--

Column 10, Claim 8, Line 13 should read as follows:
--...the at least one...--

Column 10, Claim 11, Line 38 should read as follows:
--...information is erroneous or...--

Signed and Sealed this
Thirtieth Day of September, 2014

Michelle K. Lee
*Deputy Director of the United States Patent and Trademark Office*